United States Patent Office 2,748,150
Patented May 29, 1956

2,748,150

10,13 - DIMETHYL - 17 - ACETYL - PERHYDRO-15H-CYCLOPENTA [a] PHENANTHRENE-2,3-DIONE

Clarence G. Bergstrom, Chicago, Ill., assignor, by mesne assignments, to G. D. Searle & Co., Skokie, Ill., a corporation of Delaware No Drawing. Application July 29, 1953,
Serial No. 371,160

3 Claims. (Cl. 260—397.4)

The present application relates to a novel type of 2,3-dioxosteroids which are in equilibrium with 2,3-ketols. Specifically, my invention relates to the conversion of a 2 - bromo - 10,13-dimethyl-17-acetyl-perhydro-15H-cyclopenta[a]phenanthren-3-one of the structural formula

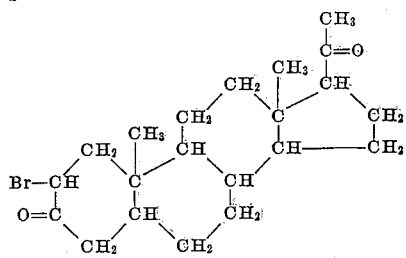

to an equilibrium mixture consisting of the following compounds

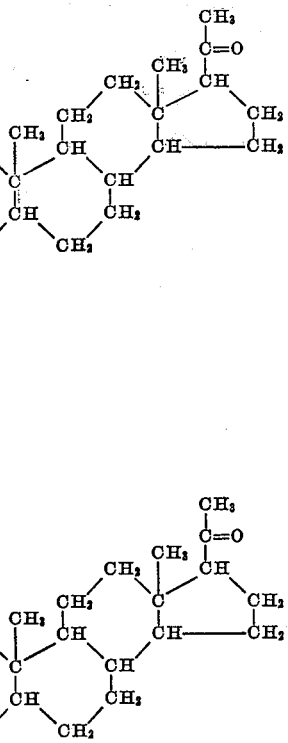

The present evidence indicates that in this equilibrium mixture, the Δ³-2-oxo-3-ol predominates.

This reaction is conveniently carried out by heating the 2 - bromo - 10,13-dimethyl-17-acetyl-perhydro-15H-cyclopenta[a]phenanthren-3-one with a secondary amine which has a dissociation constant pK=$10^{-1}$ to $10^{-5}$ in the presence of at least one equivalent of water. Among the reagents suitable for this reaction are lower dialkylamines and cyclic secondary amines such as piperidine, morpholine and piperazine.

In an alternative procedure for the preparation of the claimed compositions the pyridinium salt of 2-bromo-10,13-dimethyl - 17 - acetyl-perhydro-15H-cyclopenta[a]-phenanthren-3-one is treated with a nitrosoaniline derivative, such as p-nitrosodimethylaniline, to produce the nitrone which is then decomposed with acid.

The compounds produced by my invention provide valuable therapeutic agents for the treatment of diseases associated with adrenocorticoid imbalance. They possess the advantage over naturally occurring steroidal drugs that they lack undesirable secondary effects which limit the clinical utility of the naturally occurring substances.

My invention will appear in further detail from the following examples. However, the invention is not to be construed as limited by the details set forth in spirit or in scope. It will be apparent to those skilled in the art that numerous modifications of materials and methods can be practiced without departing from the invention. In these examples, temperatures are given in degrees centigrade (° C.) and relative amounts of materials in parts by weight.

Example 1

A mixture of 100 parts of 2-bromoallopregnane-3,20-dione, 860 parts of piperidine and 5 parts of water is heated on the steam bath for 9 hours and then permitted to remain at room temperature for 15 hours. Most of the piperidine is evaporated under nitrogen and the resulting sludge is triturated with 220 parts of hot petroleum ether. The precipitated piperidine hydrobromide is removed on a filter, and the filtrate is evaporated under vacuum to yield a viscous syrup. This syrup is taken up in benzene and the benzene solution is washed with 1-N hydrochloric acid and then with water. The benzene solution is dried over anhydrous calcium sulfate and evaporated to yield a semi-crystalline residue. The latter is applied to a chromatography column containing silica gel. Elution of the column with a 5% solution of ethyl acetate in benzene and evaporation of the eluate yields a product which, after two crystallizations from butanone, melts at about 204–207° C. The empirical formula of the product is $C_{21}H_{30}O_3$. The ultraviolet absorption spectrum of a methanolic solution shows a maximum at 270 millimicrons with a molecular extinction coefficient of 6220. The spectrum of a 1-N methanolic potassium hydroxide solution shows an ultraviolet absorption maximum at 315 millimicrons with an extinction coefficient of 3620. The infrared absorption spectrum shows maxima at 2.90, 5.89 and 6.00 microns. The product apparently consists of an equilibrium mixture of the 3-hydroxy-10,13-dimethyl-17-acetyl-1,2,5,6,7,8,9,10,11,12,13,14,16,17-tetradecahydro-15H-cyclopenta[a]phenanthren-2-one, 10,13-dimethyl-17-acetyl-perhydro-15H-cyclopenta[a]phenanthrene-2,3-dione, and 2-hydroxy-10,13-dimethyl-17-acetyl-3,4,5,6,7,8,9,10,11,12,13,14,16,17-tetradecahydro-15H-cyclopenta[a]phenanthren-3-one wherein the 3-hydroxy-allopregnane-2,20-dione predominates.

*Example 2*

A stirred mixture of 2874 parts of the pyridinium salt of 2-bromoallopregnane-3,20-dione (prepared according to Marker et al., J. Am. Chem. Soc., vol. 61, p. 1333; 1939), 909 parts of p-nitrosodimethylaniline, 3000 parts of ethanol and 5700 parts of chloroform is treated in an ice bath with 2400 parts of 2.8-N aqueous sodium hydroxide solution. The ice bath is removed and stirring is continued for 4 hours at room temperature. After concentration to about 4000 parts by vacuum distillation the reaction mixture is left to crystallize. The 2-(p-dimethylphenyl)-imine oxide of allopregnane-3,20-dione thus obtained melts at about 201–202° C. The ultraviolet absorption spectrum shows maxima at 261, 297 and 418 millimicrons with molecular extinction coefficients of 18,800, 11,000 and 3940 respectively. The molecular rotation of an 0.167% chloroform solution is $[\alpha]_D = +404°$. The compound has the structural formula

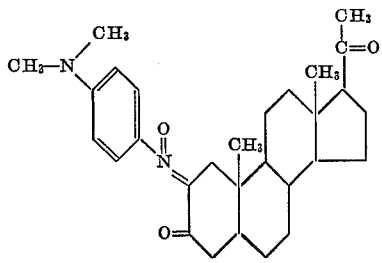

A mixture of 5 parts of this oxide, 1030 parts of 2-N hydrochloric acid and 880 parts of benzene is stirred under nitrogen for one hour. The benzene layer is separated, washed with water and shaken with cold 20% aqueous potassium hydroxide. The precipitated potassium salt of the enolate is collected on a filter and washed with benzene. The enol is regenerated by shaking of a benzene suspension with 1-N hydrochloric acid. The benzene solution is dried and evaporated and the residue is recrystallized twice from ethyl acetate. The crystals melt at about 207–210° C. The product is the same as that produced in Example 1.

I claim:

1. The process of heating a 2-bromo-10,13-dimethyl-17-acetylperhydro-15H-cyclopenta[a]phenanthrene with a secondary amine of a dissociation constant between $10^{-1}$ and $10^{-5}$, in the presence of water, to produce a mixture of 2-hydroxy-10,13-dimethyl-17-acetyl-3,4,5,6,7,8,9,10,11,12,13,14,16,17-tetradecahydro-15H-cyclopenta[a]phenanthren-3-one, 10,13-dimethyl-17-acetyl-perhydro-15H-cyclopenta[a]phenanthrene-3,20-dione, and 3-hydroxy-10,13-dimethyl-17-acetyl-1,2,5,6,7,8,9,10,11,12,13,14,16,17-tetradecahydro-15H-cyclopenta[a]phenanthren-2-one.

2. A compound selected from the group consisting of 10,13-dimethyl-17-acetyl-perhydro-15H-cyclopenta[a]phenanthrene-2,3-dione and its enolic equivalents.

3. A compound of the structural formula

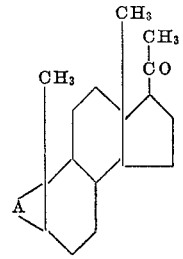

wherein A is the bivalent group

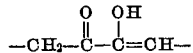

References Cited in the file of this patent
UNITED STATES PATENTS
2,340,388    Inhoffen _____ Feb. 1, 1944